July 10, 1945.　　　D. D. MacCARTHY　　　2,380,255
PROTECTIVE DEVICE
Filed Aug. 17, 1943
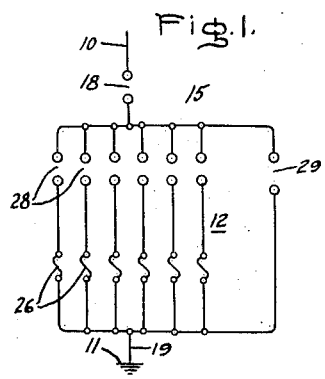
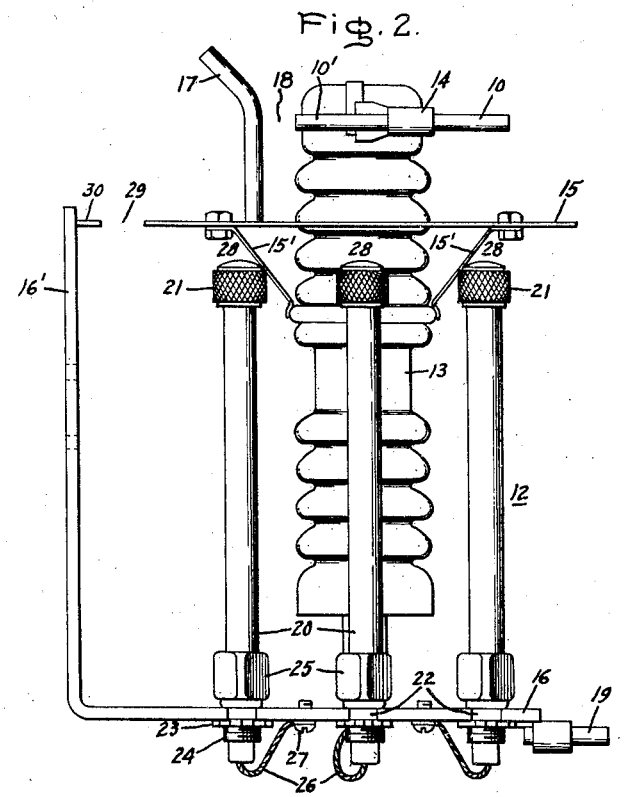
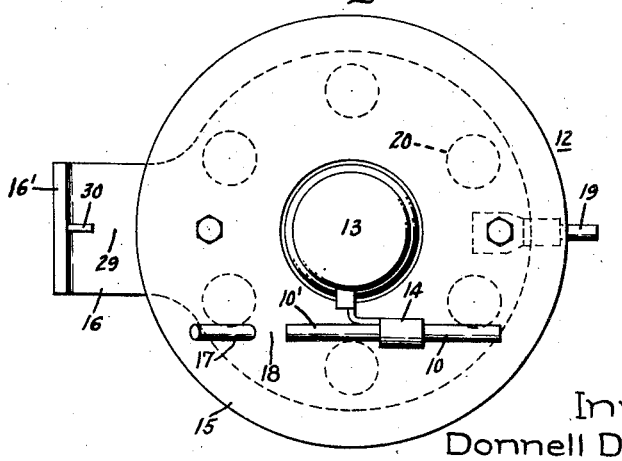
Inventor:
Donnell D. MacCarthy,
by Harry E. Dunham
His Attorney.

Patented July 10, 1945

2,380,255

UNITED STATES PATENT OFFICE 2,380,255

PROTECTIVE DEVICE

Donnell D. MacCarthy, Pittsfield, Mass., assignor to General Electric Company, a corporation of New York Application August 17, 1943, Serial No. 498,924

6 Claims. (Cl. 200—115)

My invention relates to protective devices and more particularly to a fused gap form of protective device for protecting an electric circuit such as a transmission line, or an electric apparatus such as a transformer against excess voltages such as surge voltages.

This application is a continuation-in-part of my application Serial No. 463,339 filed October 26, 1942 for "Protective device."

Electric circuits such as transmission lines are subject to high potential surges which are usually caused by lightning but may also be caused by switching certain portions of the circuit. Such high potential surges, in the main produced by lightning, frequently cause severe damage to transmission lines or connected apparatus.

Many protective devices have been suggested and used to dissipate these surge potentials on electric circuits whether they be low voltage circuits or apparatus or high voltage transmission lines. Probably the first devices used for rendering such surge voltages ineffective to damage parts of an electric circuit or associated apparatus by removing the excess potential from the circuit were ordinary arc gaps connected between the electric circuit and ground. These gaps were ordinarily set to break down at a voltage somewhat above the highest normal operating voltage on the protected circuit. Once such a surge gap has broken down, however, and has reduced the excess voltage on the electric circuit with which it is associated, it would usually continue to carry current of the normal power frequency by virtue of the normal voltage existing on the circuit. In order to interrupt this so-called "power follow current," it was necessary to completely disconnect the electric circuit from the source of power which was very undesirable because of the consequent service interruption. To remedy this undesirable result such protective devices were provided with means which would interrupt the power follow current and to this end fuse devices were often placed in series with the arc gap. Such fused gaps with which my invention is particularly concerned, could act only once and it was necessary to re-fuse the device before protection was again provided for the electric circuit with which it was associated. In the event of recurrent surges such as would occur during a lightning storm, the electric circuit such as the transmission line and associated apparatus were often damaged by surges occurring on the circuit in the interim between the destruction of the fuse of the fused gap and the replacement of said fuse.

Various attempts have been made to improve such fused gaps by providing arrangements for inserting a new fuse upon rupture of one of the fuse devices, but all of these attempts have led to very complicated and uneconomical arrangements. Furthermore, all of these arrangements introduced a time delay between the rupture of one fuse device and the insertion of another fuse device which might be considerably greater than the interval between discharges in a multiple lightning stroke. My invention is particularly concerned with providing a relatively inexpensive multi-fused gap which is very satisfactory in operation and will give complete protection when recurrent voltage surges are impressed upon the protected electric circuit.

Accordingly it is an object of my invention to provide a new and improved fused gap protective device.

It is another object of my invention to provide a fused gap protective device which at any time gives a visual indication of whether the device has operated, how many times it has operated, and how many more times it is capable of operating without re-fusing or reconditioning.

Still another object of my invention is to provide a relatively inexpensive indicating multi-fused gap protective device which gives complete protection against surge voltages occurring on an electric circuit.

Further objects and advantages of my invention will become apparent as the following description proceeds and the features of novelty which characterize my invention will be pointed out with particularlity in the claims annexed to and forming a part of this specification.

Referring now to the drawing, Fig. 1 is a schematic diagram of an arrangement embodying my invention; Fig. 2 is an elevational view of the multi-fused gap protective device of my invention, and Fig. 3 is a top view of the device shown in Fig. 2.

Referring now to Fig. 1, an electric circuit 10 such as a transmission line or other electrical apparatus only a very small portion of which is shown, is protected by a protective device embodying my invention which connects electric circuit 10 to ground 11 under certain predetermined conditions to remove excess voltage surges therefrom. The protective device generally indicated at 12 comprises an insulator 13 best illustrated in Figs. 2 and 3 which is provided with a suitable hanger 16' for mounting on a cross-arm or pole of a transmission line. It should be understood, however, that insulator 13 might also be the insulated bushing of an electric translating apparatus such as a transformer if the protective device of my invention is used for protecting a distribution transformer or the like. At the upper end of insulator 13 there is provided a line terminal 14 which may be directly connected with transmission line 10. Attached to the upper and lower portions respectively of insulator 13 are a pair of spaced conducting means 15 and 16, the upper spaced conducting means 15 being mounted near the upper part of insulating support 13 and comprising an annular plate suitably supported from insulator 13 as by brackets 15'. A conducting member 17 is electrically connected with upper spaced conducting means 15 and is so positioned relative to the end 10' of electric circuit 10 adjacent line terminal 14 so as to provide an arc gap 18. The corresponding parts of the schematic diagram of Fig. 1 are designated by the same reference numerals as in Figs. 2 and 3.

Lower spaced conducting means 16 which is illustrated as an integral part of hanger 16' is connected to ground 11 as indicated in Fig. 1 by any suitable conductor such as 19 which is suitably connected to lower spaced conducting means 16 as indicated in Figs. 2 and 3. Mounted on lower spaced conducting means 16 which, in turn, supports insulator 13 are a plurality of fuse devices each comprising a fuse tube 20 having an upper terminal 21. These fuse devices are hereinafter referred to generally by the numeral 20 designating the fuse tube and are removably mounted in notched openings 22 in lower spaced conducting means 16. Any suitable means for fastening these fuse devices 20 on spaced conducting means 16 may be employed. In Fig. 2, I have illustrated this fastening means for each fuse device as comprising a nut 23 engaging the lower threaded end 24 of fuse tube 20 so as to clamp the fuse tube which is inserted in the corresponding notched opening 22 between nut 23 and a suitable enlargement 25 provided for each fuse tube 20 which may also be threadedly mounted on the fuse tube.

The fuse devices 20 are of course all identical in construction and preferably are of the same construction as the fuse tubes used in the well-known fuse cutouts of the prior art each including a suitable fusible element or fuse link therein only the lower terminal portion 26 of which is visible in Fig. 1 of the drawing. These readily replaceable fuse links are suitably mounted within fuse tubes 20 in a manner well understood by those skilled in the art with the upper terminals thereof connected with the upper terminals 21 of the fuse tubes. The lower terminal portion 26 of each fuse link, which fuse links are also generally designated by the numeral 26, is electrically connected to the bottom of lower spaced conducting means 16 as indicated at 27. With this arrangement a very suitable indicating means is provided since rupture of the fuse link in any one of the fuse tubes will cause the lower terminal portion 26 and any undestroyed portion of the fuse link to dangle downwardly from lower spaced conducting means 16. Accordingly by merely examining the fuse links connected to conducting means 16 an operator may readily determine from a reasonable distance, how many times the protective device of my invention has operated as well as how many times it can still operate without re-fusing. This last indication is very desirable and has not been possible with many surge voltage protective devices used heretofore.

In the drawing, I have illustrated six fuse devices circumferentially arranged on lower spaced conducting means 16 around insulator 13. It should be understood, however, that a larger or smaller number of fuse devices 20 may be provided depending upon the recurrence of voltage surges on the protected electric circuit. Detailed studies have been made to determine the recurrence of lightning strokes on electric transmission lines or the like, which provide a basis for estimating the number of fuse devices needed. This number will also depend upon the frequency of lightning storms in the particular area, the frequency of inspection, and the exposure of the particular line.

In order to form the fused gap protective means of my invention, each of the upper terminals 21 of the fuse tubes 20 is spaced a predetermined distance from upper spaced conducting means 15 so as to provide an arc gap 28 associated with each fuse tube 20 which is serially arranged with an arc gap 18 common to all of the fused gaps. Two sets of gaps are provided in order to minimize the possibility of an accidental short circuit by birds, animals, sleet or snow.

An unfused "back-up gap" generally indicated at 29 is connected between the spaced conducting means 15 and 16 so that in the event that all of the fuses in the tubes 20 are blown, the back-up gap will limit the voltage although it is unable to interrupt the flow of power frequency current from 10 to 11. The "back-up gap" 29 should have a greater spark over voltage than any of the gaps 28 so that it will not operate until all of fuses have blown. As illustrated in Fig. 2 the "back-up gap" 29 is provided between conducting member 15 and an extension 30 of hanger 16' which is electrically connected to conducting means 16.

With this arrangement the gap spark potential of the multi-fused gap protective device can be designed so as to be proportional to the circuit rating. The gaps 18 and 28 can be adjusted to prevent flashover at normal voltage but to arc-over on surge voltages occurring on electric circuit 10. The fuse devices 20 can then be designed to interrupt the current which will occur and the length of the fuse tube and the design thereof will depend upon the power-follow current to be interrupted and the operating voltage of the power line.

The fusible element or fuse link, in one of the fuse tubes 20 will likely be blown by the impulse or surge current or more likely by the power-follow current every time one of the gaps arcs over. By connecting a plurality of fused gaps in parallel as indicated in the drawing, complete protection against recurrent surges on electric circuit 10 will result. It will be understood that manufacturing tolerances will cause sufficient variances in the construction of each individual fused gap so that only one fused gap will operate at a time. However, it should also be understood that, if desired, the gaps 28 which have all been indicated as having the same spacing, may be adjusted to have different spacings to assure that only one gap will operate at any one time.

In addition to the advantage that my fused gap protective device may be designed so as to be proportional to the circuit rating, it also has the advantage that any leakage current over insulator 13 will be conducted directly to ground so that no voltage stress will be impressed on the fuse tubes 20 with blown links. These tubes are ordinarily of organic material and liable to damage if subjected to appreciable voltages. Also, since the respective fuse links normally short circuit the fuse tubes 20, no difficulties due to tracking or charring of the fiber will occur as have been encountered in the expulsion gap type protective devices of the prior art. It is also possible to hold the impulse voltage to a lower value with the multiple fused gap device than with the prior art expulsion gap type device since relatively small gap settings may be used, sufficient only to withstand the line voltage and surges of low magnitude which will not damage insulation. In the expulsion gap type of protective device it is necessary to set the external gap, comparable to gap 18 of my invention, at a value which will keep the voltage off of the fiber tube and the other, internal, series gap must be long enough to interrupt the fault current flowing in a high voltage system. With my invention, the fuse device interrupts the power-follow current and the gap settings merely determine the magnitude of the surge voltage which will operate the device. Therefore, the fuse tubes 20 may be designed so that there is little likelihood of impulse bursting and, as was pointed out above, the device gives complete indication of the operating condition thereof at any time and particularly as to how many more times it can satisfactorily operate.

Instead of using fuses of the expulsion type as is indicated in Fig. 2 of the drawing, so-called "current limiting" fuses of the type disclosed in United States Letters Patent 2,309,489, Williams et al., assigned to the same assignee as the present application may be employed. Since such fuses can interrupt the fault current before it attains its maximum value, they would reduce the magnitude of the fault current and the severity of the disturbance to which the system being protected would be subjected.

With my invention, a fused gap is always ready to protect associated apparatus since the fused gaps are arranged in parallel and there is no interval of time when no protection is afforded as in prior art devices where several seconds elapse between the operation of one fused gap and the subsequent insertion of another fused gap to protect the circuit and apparatus.

In view of the detailed description included above, the operation of the protective device of my invention will be obvious to those skilled in the art and no further discussion will be included here.

While I have described a particular embodiment of my invention, it will be apparent to those skilled in the art that my invention is not limited to the construction shown but that changes and modifications may be made without departing from the spirit and scope of my invention, and I aim in the appended claims to cover all such changes and modifications.

What I claim as new and desire to secure by Letters Patent of the United States is:

1. In combination, an insulating member, a pair of spaced conducting means associated with said member, a plurality of fuse tubes supported in spaced relationship on one of said spaced conducting means, a terminal at the corresponding end of each of said fuse tubes, a fuse link in each fuse tube electrically connected to the terminal associated with said fuse tube, all of said fuse links being electrically connected to said one spaced conducting means, said fuse tubes being mounted so that all of said terminals are spaced a predetermined distance from said other spaced conducting means, and a back-up gap connected between said spaced conducting means in parallel with the circuit through all of said fuse tubes.

2. In combination, an insulating member, a pair of spaced conducting means associated with said member and connected to an associated electric circuit, a plurality of parallel connected fused gaps interconnecting said spaced conducting means so as to provide protection against recurrent voltage surges on said associated electric circuit, and an unfused back-up gap connected in parallel with all of said fused gaps to afford protection against overvoltages.

3. In combination, an insulator, a pair of spaced conducting means at least one of which is mounted on said support, both of said spaced conducting means being connected to an associated electric circuit, a plurality of parallel arranged fused gaps interconnecting said spaced conducting means, each comprising a fuse tube, a fuse link in each of said fuse tubes having one terminal thereof connected to said one spaced conducting means, means for supporting said fuse tubes from said one spaced conducting means, and an unfused back-up gap connected in parallel with said plurality of fused gaps.

4. In combination, an insulating support, a pair of spaced conducting means associated with said support and connected to an associated electric circuit, a plurality of parallel arranged fused gaps interconnecting said spaced conducting means each comprising a fuse tube mounted on one of said spaced conducting means, a fuse link in each of said fuse tubes having one terminal thereof connected to said one spaced conducting means, one of said fused gaps being designed to operate upon the occurrence of a surge voltage on said associated electric circuit whereby protection against recurrent voltage surges is provided, said fuse links and said one spaced conducting means being so constructed and arranged as to provide a visual indication of the operating condition of all of said fused gaps, and an unfused back-up gap connected between said spaced conducting means.

5. In combination, an insulating member, a pair of spaced conducting means associated with said member and connected to an associated electric circuit, a plurality of parallel connected fused gaps interconnecting said spaced conducting means so as to provide protection against recurrent voltage surges on said associated electric circuit, an unfused back-up gap in parallel with said plurality of parallel connected fused gaps, and a gap connected in series with said fused and unfused gaps.

6. In combination, an insulating support, a pair of spaced conducting means mounted on said support and connected to an associated electric circuit, a plurality of parallel connected fused gaps circumferentially arranged around said insulating support interconnecting said spaced conducting means so as to provide protection against recurrent voltage surges on said associated electric circuit, and an unfused back-up gap in parallel with said plurality of parallel connected fused gaps.

DONNELL D. MacCARTHY.